(12) United States Patent
Crippa et al.

(10) Patent No.: US 10,738,850 B2
(45) Date of Patent: Aug. 11, 2020

(54) DISC BRAKE CALLIPER BODY

(71) Applicant: FRENI BREMBO S.P.A., Curno, Bergamo (IT)

(72) Inventors: Cristian Crippa, Curno (IT); Adriano Bonetti, Curno (IT); Lorenzo Nessi, Curno (IT); Gabriele Riva, Curno (IT)

(73) Assignee: Freni Brembo S.p.A., Curno, Bergamo (IT)

( * ) Notice: Subject to any disclaimer, the term of this patent is extended or adjusted under 35 U.S.C. 154(b) by 0 days.

(21) Appl. No.: 15/772,870

(22) PCT Filed: Oct. 27, 2016

(86) PCT No.: PCT/IB2016/056464
§ 371 (c)(1),
(2) Date: May 2, 2018

(87) PCT Pub. No.: WO2017/077428
PCT Pub. Date: May 11, 2017

(65) Prior Publication Data
US 2018/0328431 A1    Nov. 15, 2018

(30) Foreign Application Priority Data
Nov. 2, 2015    (IT) .......................... 102015000068036

(51) Int. Cl.
*F16D 65/847*    (2006.01)
*F16D 55/228*    (2006.01)
(Continued)

(52) U.S. Cl.
CPC .......... *F16D 65/847* (2013.01); *F16D 55/228* (2013.01); *F16D 65/0068* (2013.01);
(Continued)

(58) Field of Classification Search
CPC .. F16D 65/847; F16D 55/228; F16D 65/0068; F16D 2055/0016
See application file for complete search history.

(56) References Cited

U.S. PATENT DOCUMENTS 5,002,160 A * 3/1991 Weiler ................. F16D 55/228
188/264 AA
5,620,063 A    4/1997 Smith
(Continued)

FOREIGN PATENT DOCUMENTS

EP    0710777 A2    5/1996
EP    1016804 A1    7/2000
(Continued)

OTHER PUBLICATIONS

European Patent Office, International Search Report with Written Opinion issued in PCT/IB2016/056464, dated Mar. 15, 2017, 11 pages, European Patent Office, Rijswijk, Netherlands.

*Primary Examiner* — Xuan Lan Nguyen
(74) *Attorney, Agent, or Firm* — Marshall & Melhorn, LLC (57) ABSTRACT

A disc brake caliper body adapted to be arranged straddling a brake disc. The caliper body includes at least one elongated element connecting bridge which connects a first wheel side elongated element to a second wheel opposite side elongated element adapted to be arranged straddling the brake disc. The caliper body includes at least one air conveying channel which extends longitudinally as a connecting bridge which connects the first wheel side elongated element to said second wheel opposite side elongated element so as to be adapted to be arranged straddling the brake disc. The disc outlet channel side includes a disc outlet channel side portion free edge, a channel bottom includes a channel bottom portion free edge, a disc inlet channel side free edge,
(Continued)

a disc outlet channel side portion free edge and a channel bottom portion free edge defining a cooling air collection and conveying inlet.

10 Claims, 10 Drawing Sheets

(51) Int. Cl.
  *F16D 65/00* (2006.01)
  *F16D 55/00* (2006.01)
  *F16D 125/06* (2012.01)

(52) U.S. Cl.
  CPC ............ *F16D 2055/0016* (2013.01); *F16D 2055/0091* (2013.01); *F16D 2125/06* (2013.01)

(56) References Cited

U.S. PATENT DOCUMENTS

| | | |
|---|---|---|
| 6,446,766 B1 | 9/2002 | Cornolti et al. |
| 8,151,951 B2 | 4/2012 | Cornolti et al. |
| 8,448,753 B2 | 5/2013 | Petrini |
| 9,273,740 B2 | 3/2016 | Moore |
| 9,400,025 B2 * | 7/2016 | Maestrini ............... F16D 55/228 |
| 2007/0163851 A1 * | 7/2007 | Alexander .............. F16D 55/22 188/264 F |
| 2010/0065387 A1 * | 3/2010 | Tsiberidis ........... F16D 65/0031 188/218 A |
| 2010/0101899 A1 | 4/2010 | Finkel |
| 2013/0092481 A1 * | 4/2013 | Crippa .................. F16D 55/228 188/73.31 |
| 2015/0021124 A1 * | 1/2015 | Preda .................... F16D 55/228 188/71.6 |
| 2015/0027821 A1 * | 1/2015 | Nessi .................... F16D 55/224 188/72.3 |

FOREIGN PATENT DOCUMENTS

| | | |
|---|---|---|
| EP | 1610027 A1 | 12/2005 |
| EP | 2284415 A1 | 2/2011 |
| GB | 2473001 A | 3/2011 |
| GB | 2520239 A | 5/2015 |
| JP | H03194226 A | 8/1991 |
| JP | 2009036212 A | 2/2009 |
| JP | 2011241876 A | 12/2011 |
| WO | 2010/051135 A1 | 5/2010 |

* cited by examiner

DISC BRAKE CALLIPER BODY

FIELD OF THE INVENTION

The present invention relates to a disc brake caliper body, and also to a caliper comprising such a body, and to a braking system comprising such a caliper.

In particular, the present invention relates to a disc brake caliper body.

BACKGROUND ART

The brake caliper in a disc brake is generally arranged straddling the outer peripheral margin of a brake disc, adapted to rotate around a rotation axis defining an axial direction (X-X). Moreover, in a disc brake there is defined a radial direction (R-R) which is substantially orthogonal to said axial direction (X-X) and intersects it, and a tangential or circumferential direction (C-C), orthogonal both to said axial direction (X-X) and to said radial direction (R-R).

Brake calipers are constrained to a support structure which remains stationary with respect to the vehicle wheel, such as for example an axle-journal of a suspension of a vehicle or a hub of a vehicle wheel.

The brake caliper usually comprises a caliper body comprising two elongated portions arranged facing towards opposite braking surfaces of a brake disc, and at least one bridge which projects straddling the disc, which connects said two elongated portions to each other.

In a standard arrangement of a disc brake on a vehicle, a braking surface of the brake disc faces towards the outside of the vehicle, thus defining the vehicle outer side of the disc brake or side facing towards the vehicle wheel, and the opposite braking surface of the brake disc faces towards the vehicle itself, thus defining the side of the disc brake facing towards the vehicle. Therefore, when a brake caliper is mounted on a brake disc, a first elongated portion of the caliper body is on the outer vehicle side, or wheel side, and a second elongated portion of the caliper body is on the side facing towards the vehicle, or vehicle side. Friction pads are provided, arranged between each elongated portion of the caliper body and the facing braking surfaces of the brake disc.

In the fixed caliper bodies associated with fixed discs, both the elongated portion of the caliper body have a cylinder, or a plurality of cylinders, connected to brake fluid intake channeling and adapted to house hydraulic pistons capable of exerting a thrust action on the friction pads facing towards it or them, thus abutting them against the braking surfaces of the disc to exert the braking action on the vehicle.

This braking action on the vehicle exerts a significant friction adapted to create the desired braking torque on the vehicle itself, which friction however simultaneously generates heat which causes an increase in the temperature of the brake disc, the pads and the caliper body, while the braking action urges, thus deforming the caliper body itself.

The simultaneous increase in the temperature of the caliper body and the deformation thereof generates a risk that, if highly overheated, the caliper body deteriorates its mechanical resistance performance.

Of even more significance is the fact that the increase in temperature of the pad and the caliper body may influence the area of the thrust devices, cylinders-pistons, thus affecting the characteristics of the brake fluid in the intake conduits and the cylinder chambers. In extreme cases, there is a risk of boiling the brake fluid itself, thus forming a dangerously compressible gaseous state in the intake conduits or in the chamber formed between the cylinder and piston, the gaseous state no longer being adapted to transfer the braking control to the pistons and therefore to the pads in an adequate manner.

This very dangerous phenomenon is partly resolved using brake fluids with high boiling temperatures, and caliper bodies provided with aeration openings adapted to evacuate calories.

Examples of such solutions are for example known from documents US2011048870 of Ferrari S.p.A., JP2009036212 of SOPHIA KIKAKU KK, EP0710777A2 of Alcon Components Limited.

An example of solution aiming to increase the heat exchange between the caliper body and the air surround the caliper in order to reduce the heat accumulated by the caliper body itself is given by WO2010051135, while this example shows a solution of radiators associated with the support plates of the pads: US2015090543.

In the cases of high performing braking systems, a forced intake device of cooling air which conveys air close to the pads and the ends of the pistons resting on them is associated with the caliper body.

Examples of such solutions are for example known from documents EP1016804A1, EP2284415 and US2008277216A1 to the same Applicant, Freni Brembo S.p.A., GB2520239A to McLaren Automobile Limited, JPH03194226 to NISSAN MOTOR, JP2011241876 to AKEBONO BRAKE IND., EP1610027 to CONTINENTAL TEVES AG & CO OHG, GB2473001A to Alcon Component Limited.

However, these known solutions are highly complex to make, mount and maintain, especially in daily use vehicles, and even more so in high or very high performing vehicles.

Moreover, the need remains strongly felt to evacuate the heat effectively if the caliper body has accumulated heat, despite the cooling obtained with the air intake and circulation.

Indeed, when the heat unfortunately accumulates in the mass of the caliper body, the cooling times thereof in known forms of caliper are quite lengthy, thus exposing the braking system—in the case of repeated braking actions of significant entity—to an even more increased accumulation of heat and an increased risk of the brake fluid boiling and a deterioration of the resistance performance of the material used to make the caliper body.

SOLUTION

It is an object of the present invention to obviate the drawbacks of the prior art and to provide a solution to the needs of providing a caliper body which is simple to be constructed, installed and maintained, adapted to evacuate the heat generated during the braking action and at the same time the heat unfortunately accumulated in the mass of the caliper body itself.

This and other objects are achieved with a caliper body according to claim 1, and also with a brake caliper according to claim 9 and a vehicle according to claim 11.

Some advantageous embodiments are the object of the dependent claims.

Due to the provision of a caliper body according to the claims, an air flow is collected from the outside of the caliper and it is conveyed both to the vehicle side elongated element, or wheel opposite side, and especially to the wheel side elongated element, in particular inside these elements and close to the pads and the thrust devices, thus cooling them and especially removing any heat accumulated by the caliper body. In particular, the solution proposed allows to cool down the surface of the wheel side elongated element, and not only the inner surface thereof facing towards the pad, but for example, the upper surface thereof where, for example according to a particular embodiment, the air is also conveyed into through openings arranged between the thrust devices for cooling the whole wheel side elongated element.

Particularly, the heat exchange surface is greatly increased between the caliper body and the air surrounding it due to the fact that the channel is integral or a single piece with the elongated elements and with the bridges.

According to a particular embodiment, the direction of the cooling air flow may be oriented and it may be conveyed to the side of the caliper of the wheel side elongated element due to the provision of ribs conveniently oriented in longitudinal direction to the channel.

Due to the alternative embodiments depicted and described below, the vorticity of the air flow may be increased, thus increasing the ability thereof to extract the heat from the caliper body.

In particular, the convective heat exchange is improved between the caliper body and the air surrounding it due to the geometries proposed.

Due to the alternative embodiments which provide lowerings and windows, the discharge of hot air from the inside of the caliper body towards the outside of it may be increased and facilitated, thus evacuating the air heated by the braking action.

Moreover, a caliper body which is easy to be mounted on its support, and therefore makes it easy to maintain the braking system, may be provided due to the solutions proposed, the solution also being applicable for productions of an increased number of high performing vehicles.

FIGURES

Further features and advantages of the caliper body will become apparent from the description provided below of preferred embodiments thereof, given by way of non-limiting examples, with reference to the accompanying drawings, in which.

DESCRIPTION OF SOME PREFERRED EMBODIMENTS

Figure 1:
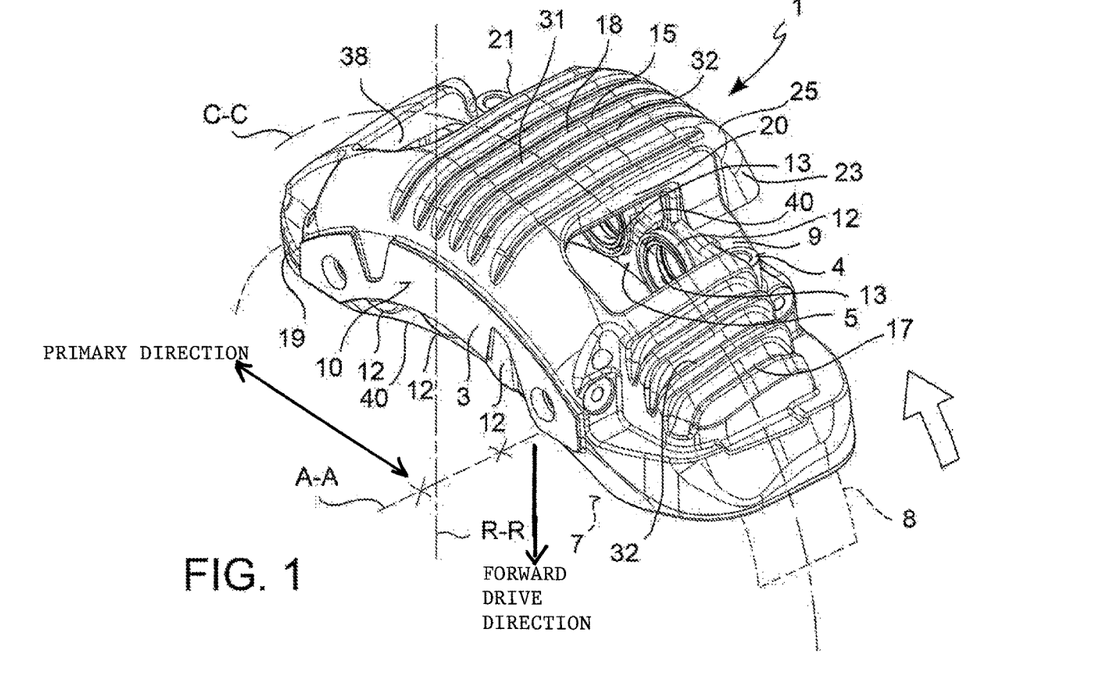
FIG. 1 shows a radially outer axonometric view-disc inlet side-wheel side of a caliper body.
Figure 2:
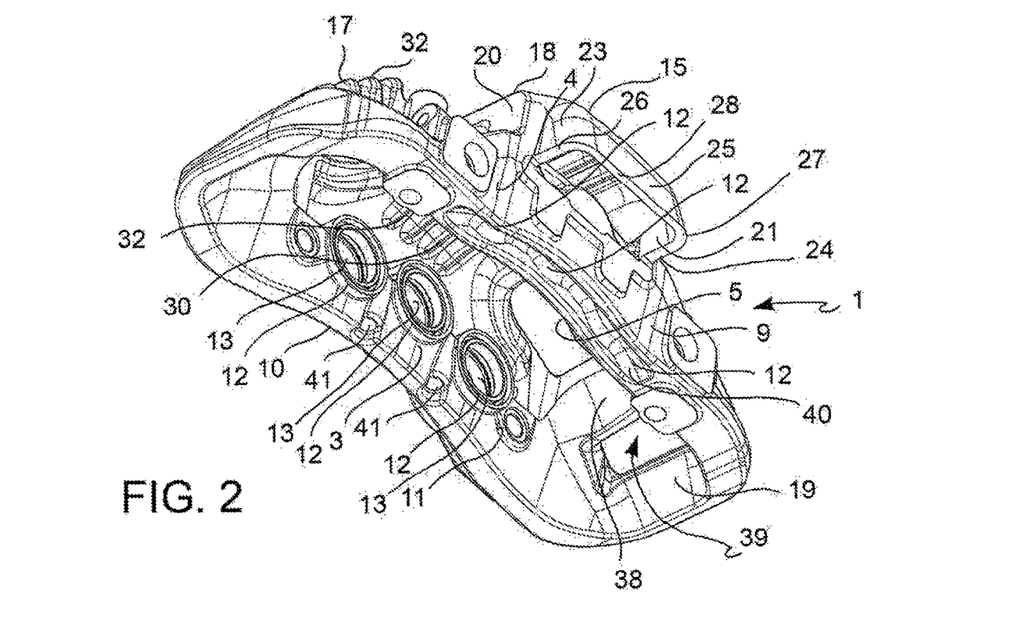
FIG. 2 shows a radially inner axonometric view-disc inlet side-vehicle side, or wheel opposite side of the caliper in FIG. 1.
Figure 3:
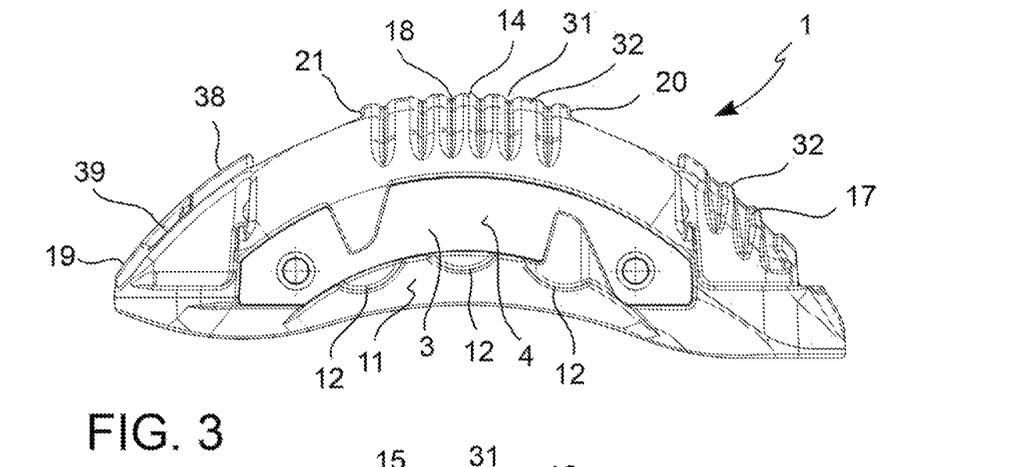
FIG. 3 shows a front-axial view wheel side of the caliper in FIG. 1.
Figure 4:
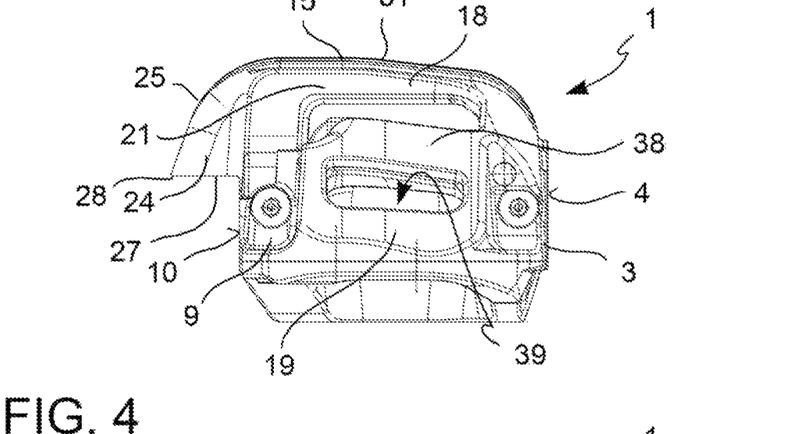
FIG. 4 shows a side-circumferential view disc outlet side of the caliper in FIG. 1.
Figure 5:
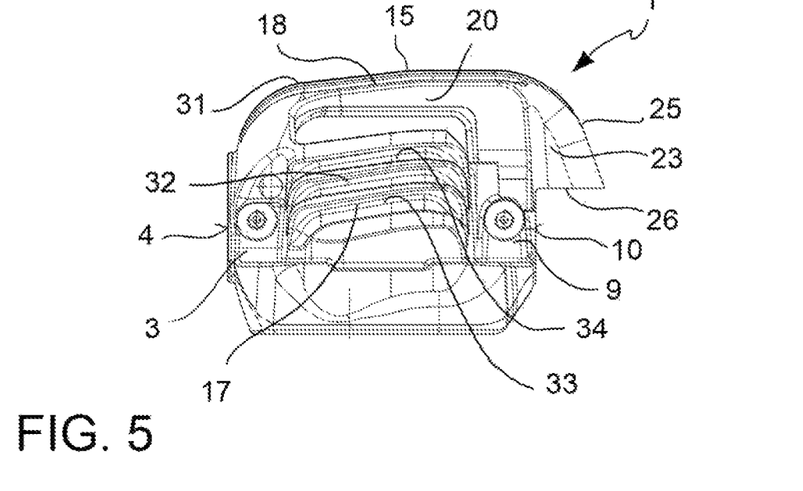
FIG. 5 shows a side-circumferential view disc inlet side of the caliper in FIG. 1.
Figure 6:
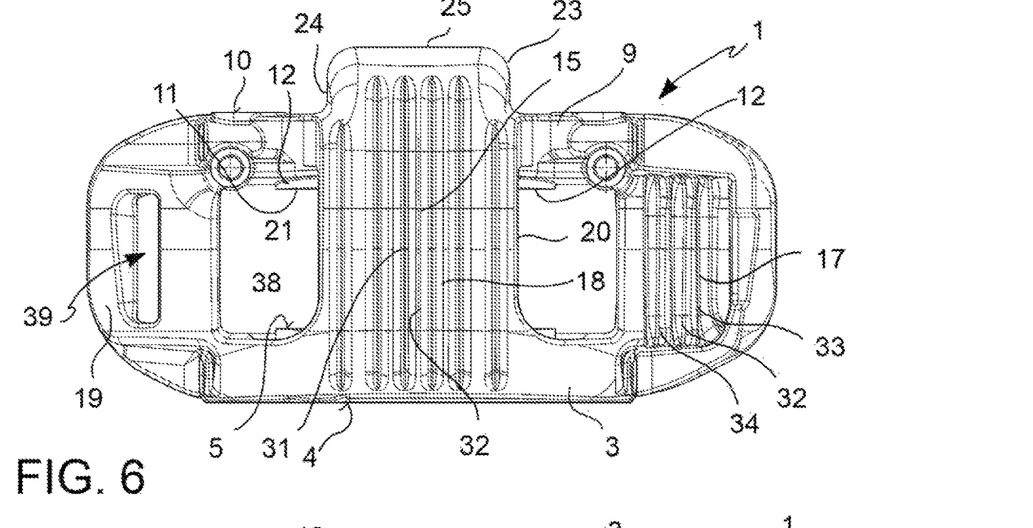
FIG. 6 shows an outer upper-radial view of the caliper in FIG. 1.
Figure 7:
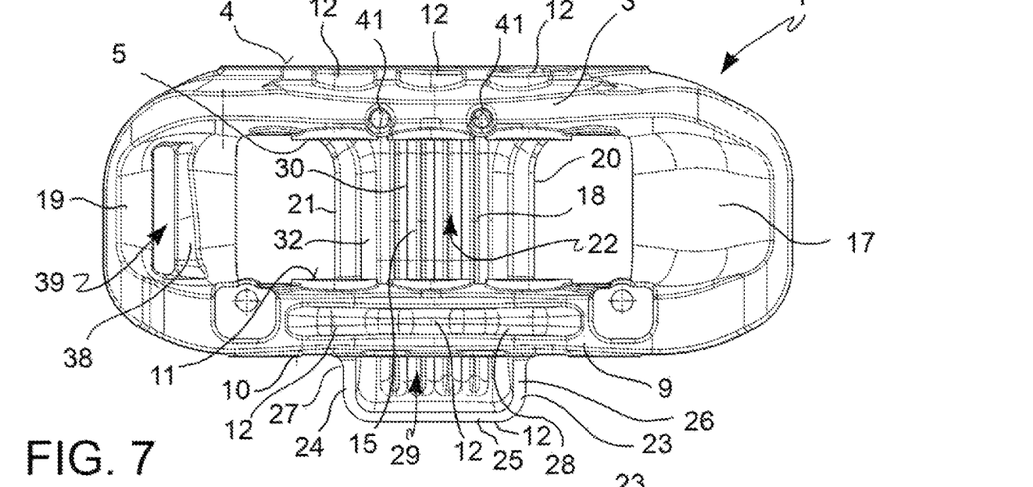
FIG. 7 shows an inner lower-radial view of the caliper in FIG. 1.
Figure 8:
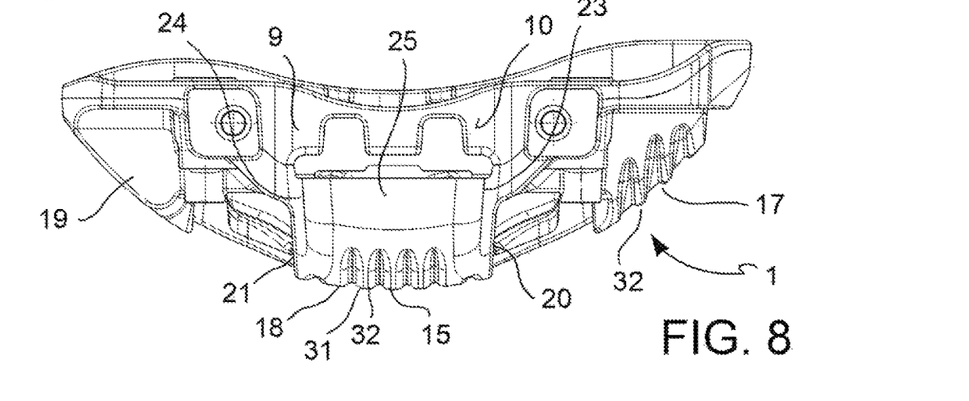
FIG. 8 shows an axial view vehicle side, or wheel opposite side, of the caliper in FIG. 1.
Figure 9:
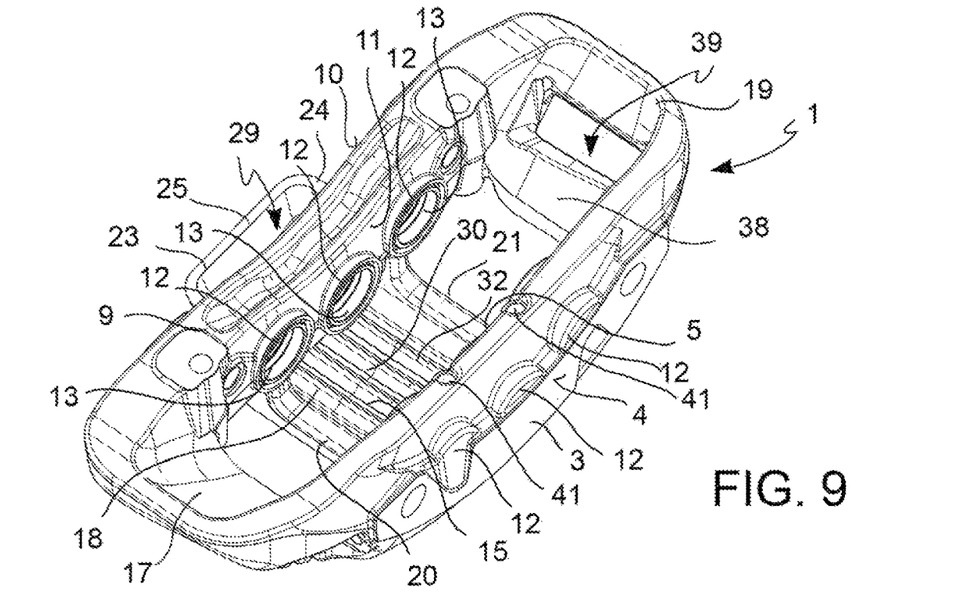
FIG. 9 shows a radially inner axonometric view-disc inlet side-vehicle side, or wheel opposite side of a caliper according to a further embodiment.
Figures 10, 11:
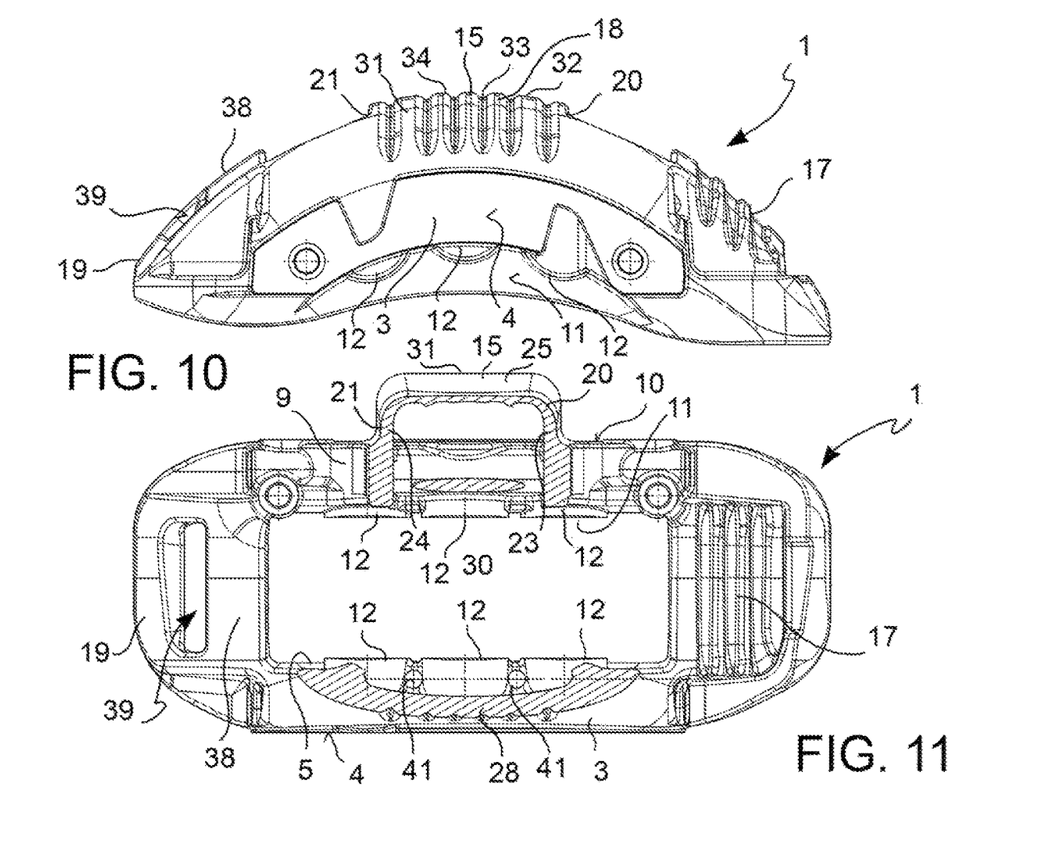
FIGS. 10 and 11 show a front-axial view wheel side of the caliper in FIG. 9 and of the section thereof according to the sectional plane indicated with C-C in FIG. 10.
Figure 12:
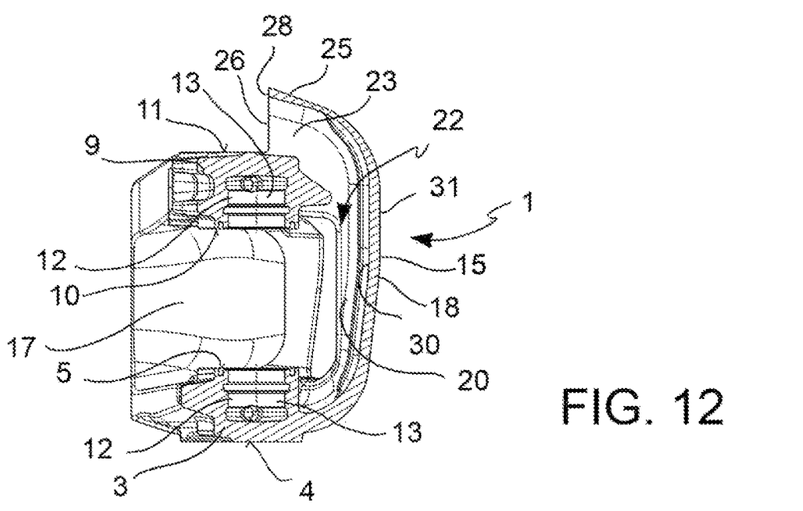
FIG. 12 shows a section of the caliper in FIG. 1, according to the plane D-D in FIG. 11.
Figure 13:
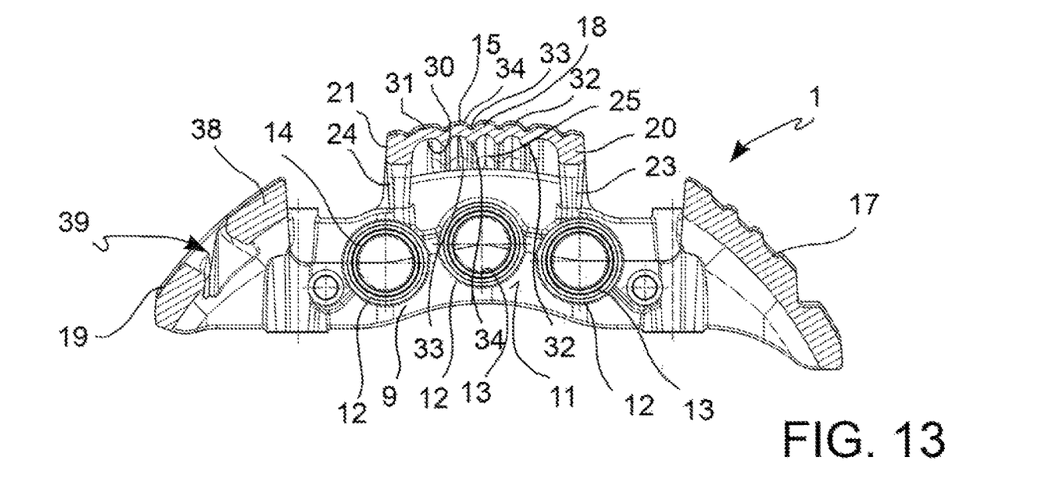
FIG. 13 shows a section of the caliper in FIG. 1, according to the plane indicated with G-G in FIG. 11.
Figure 14:
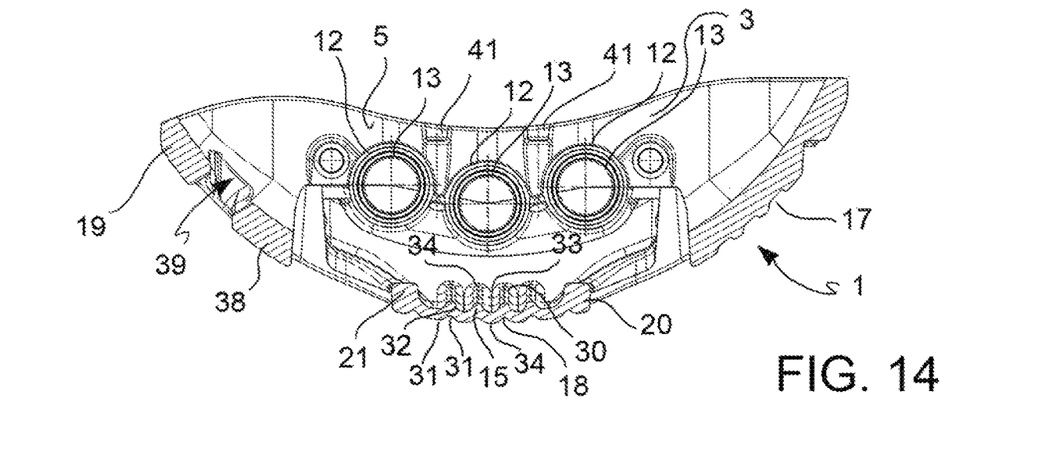
FIG. 14 shows a section of the caliper in FIG. 1, according to the plane indicated with F-F in FIG. 11.
Figure 15:
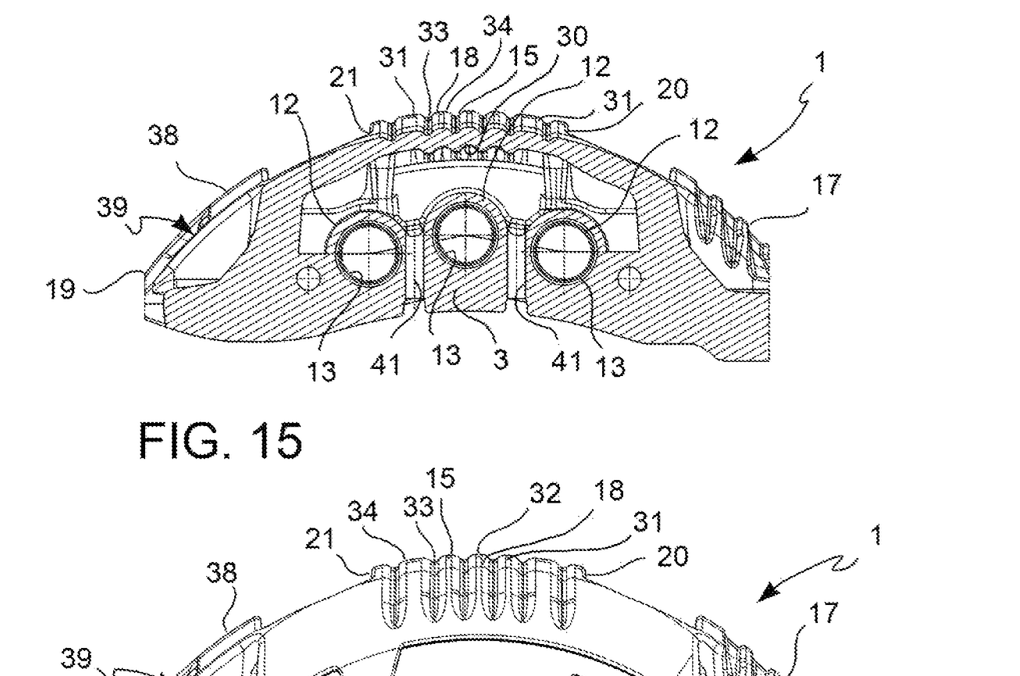
FIG. 15 shows a section of the caliper in FIG. 1, according to the plane indicated with E-E in FIG. 11.
Figure 16:
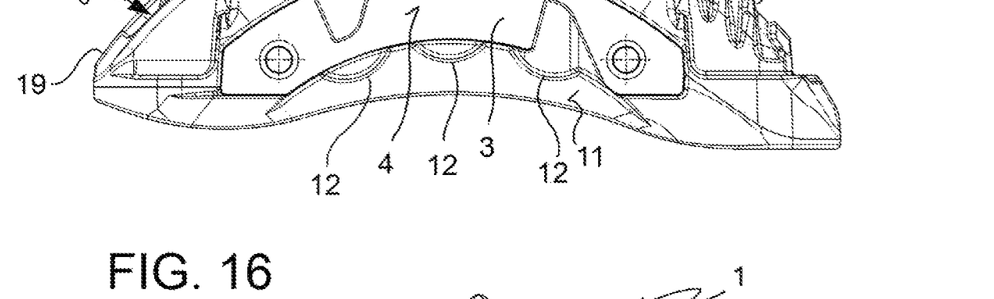
FIGS. 16 and 17 show a front-axial view wheel side of the caliper in FIG. 1 and of the section thereof according to the sectional plane indicated with A-A in FIG. 16.
Figure 17:
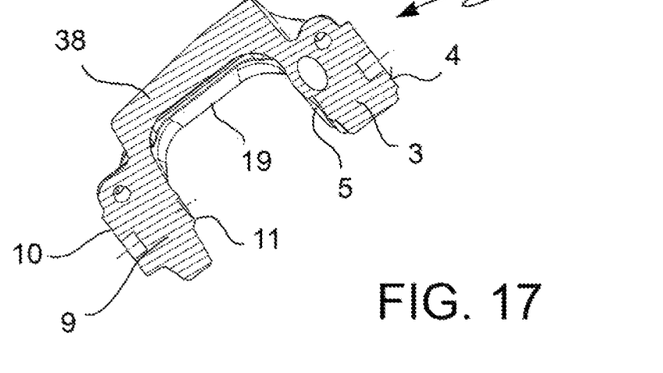
Figure 18:
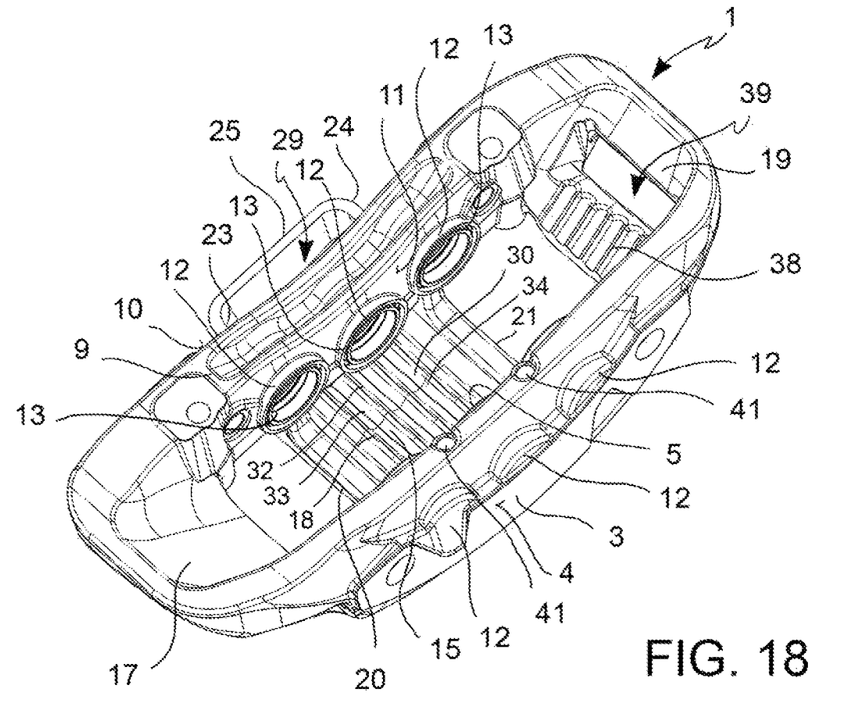
FIG. 18 shows a radially inner axonometric view-disc inlet side-vehicle side, or wheel opposite side of a caliper according to a further embodiment.
Figure 19:
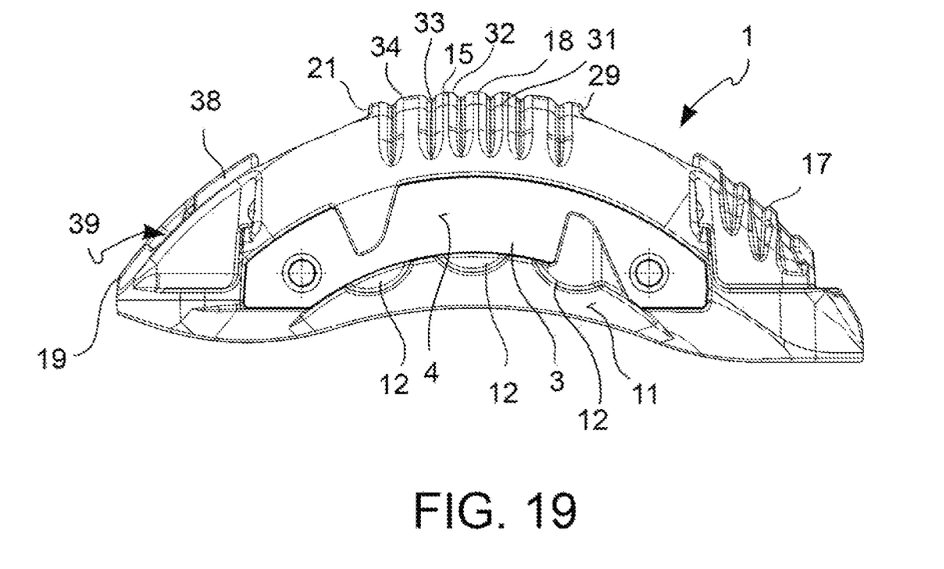
FIGS. 19 and 20 show a front-axial view wheel side of the caliper in FIG. 18 and of the section thereof according to the sectional plane indicated with B-B in FIG. 19.
Figure 20:
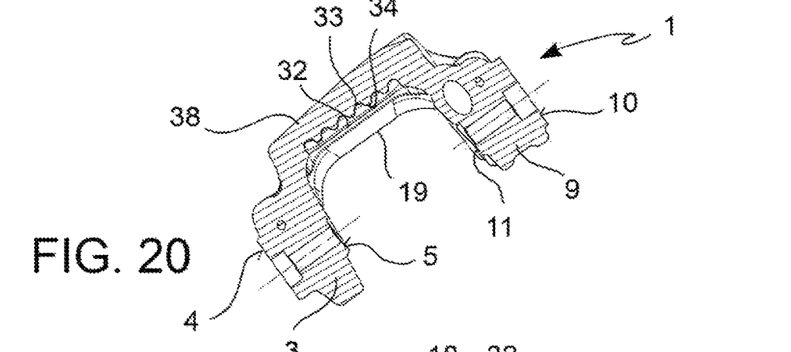
Figure 21:
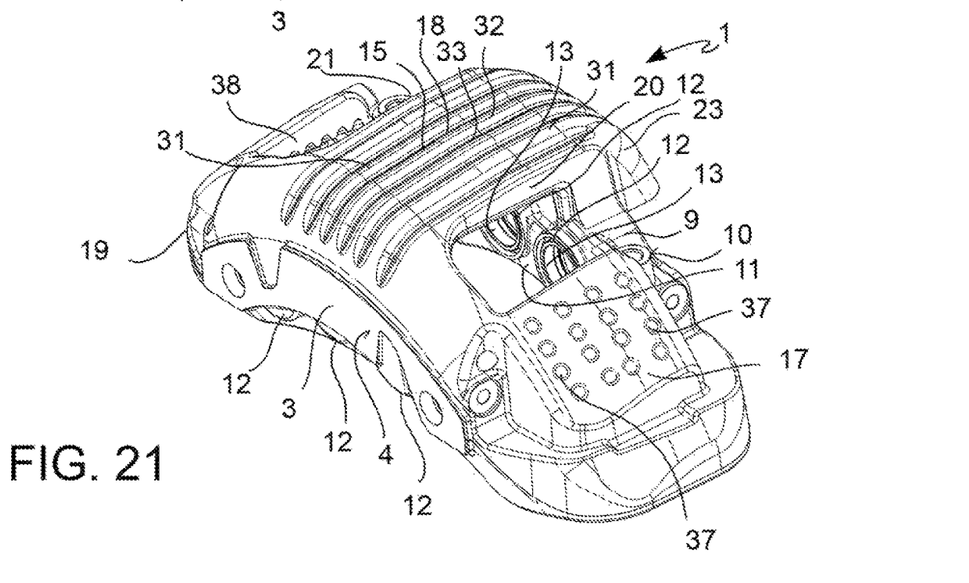
FIG. 21 shows a radially outer axonometric view-disc inlet side-wheel side of a caliper according to a further embodiment.
Figure 22:
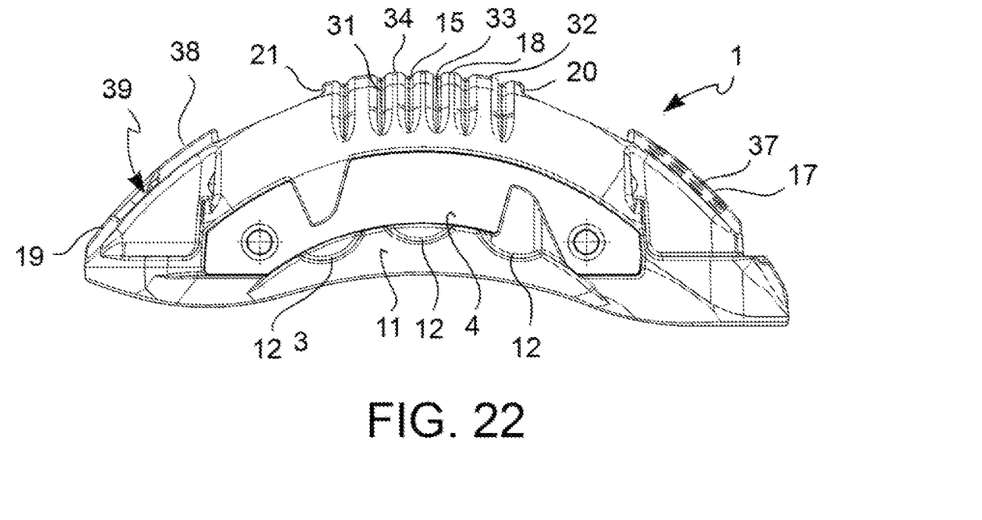
FIGS. 22 and 23 show a front-axial view wheel side of the caliper in FIG. 21 and of the section thereof according to the sectional plane indicated with A-A in FIG. 22.
Figure 23:
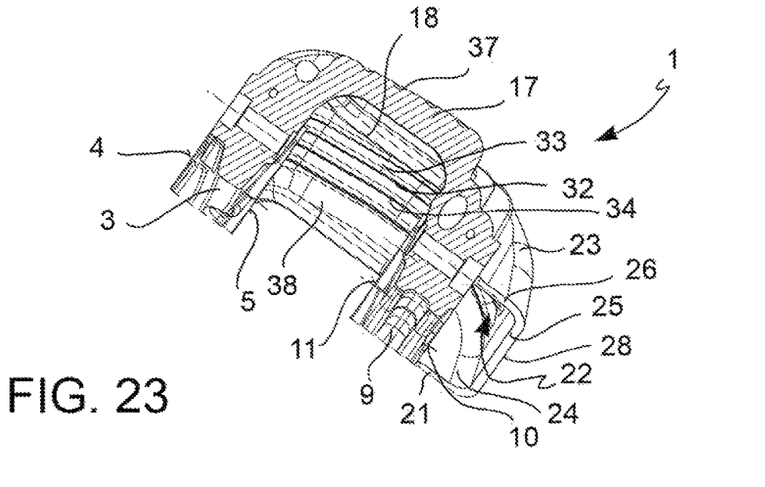
Figure 24:
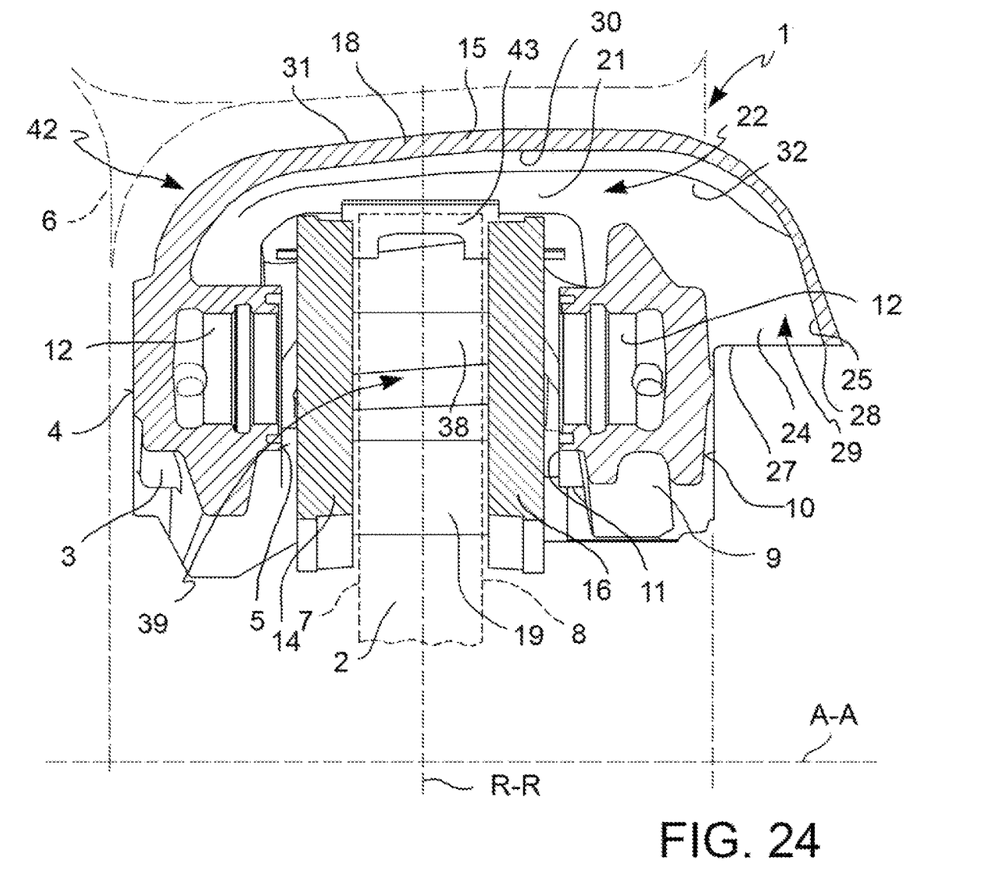
FIG. 24 shows a section of the caliper in FIG. 11 according to the plane D-D, in which there are noted the intake flow of cooling air in 4 points of the channel, indicated in the figure with numbers from 1 to 4 travelling from the channel going from the cooling air collection and conveying inlet, the cooling of the vehicle side or wheel opposite side of the caliper body and related thrust device and pad back, the crossing of the disc separated by a pad spring, and the cooling wheel side of the caliper body and related thrust device and pad back, and the pads and the thrust devices are also depicted.
Figure 25:
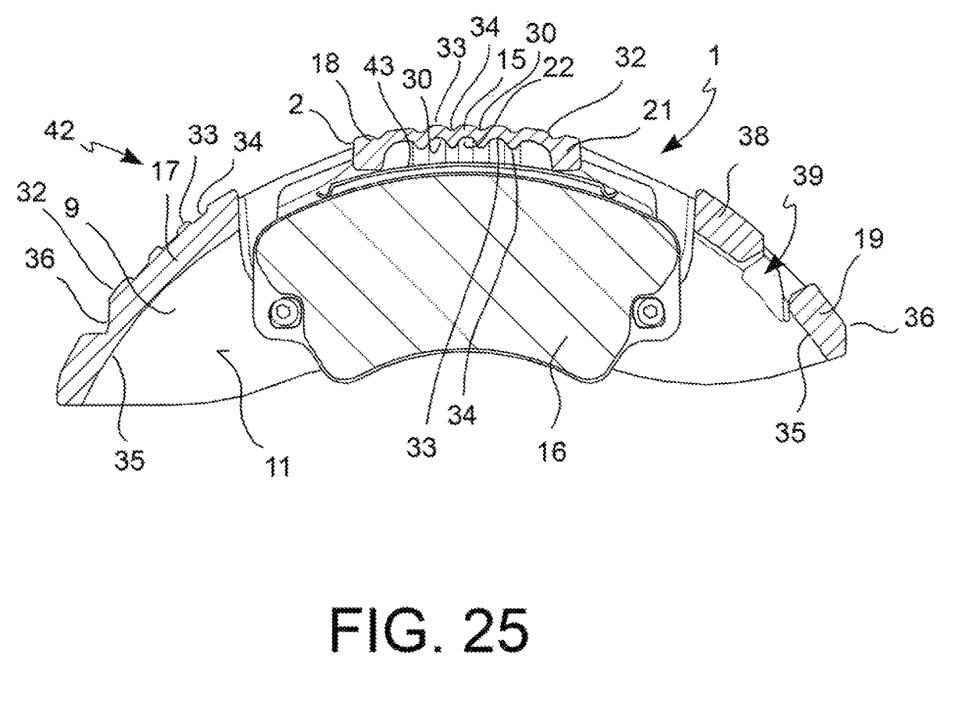
FIG. 25 shows a section of the caliper in FIG. 11 according to plane F-F, in which there are noted the hot air evacuation openings or windows and the related air flows.

According to a general embodiment of the invention, a disc brake caliper body is indicated with reference 1.

Said a caliper body is adapted to be arranged straddling a brake disc 2.

Said brake disc 2 includes a first braking surface of brake disc 7 and an opposite second braking surface of brake disc 8.

Said caliper body 1 includes a first wheel side elongated element 3, having a caliper outer side of first elongated element 4 and a caliper inner side of first elongated element 5.

Said caliper outer side of first elongated element 4 is adapted to face towards a vehicle wheel 6. At least one portion of caliper inner side of first elongated element 5 is adapted to face, directly or indirectly, for example through a first pad 14, towards said first braking surface of brake disc 7.

Said caliper body 1 includes a second wheel opposite side elongated element 9, having a caliper outer side of second elongated element 10 and a caliper inner side of second elongated element 11. At least one portion of the caliper inner side of second elongated element 11 is adapted to face, directly or indirectly, for example through a second pad 16 opposite to said first pad 14, towards said second braking surface of brake disc 8.

At least one of said first wheel side elongated element 3 and said second wheel opposite side elongated element 9 includes at least one thrust device seat 12 adapted to receive a thrust device 13 adapted to influence directly the first or second pad 14; 16 against said first or second braking surface of brake disc 7, 8.

Said caliper body 1 includes at least one elongated element connecting bridge 17, 18, 19 which connects said first wheel side elongated element 3 to said second wheel opposite side elongated element 9 so as to be adapted to be arranged straddling said brake disc 2.

Said caliper body 1 includes at least one air conveying channel 18 which extends longitudinally as a connecting bridge, which connects said first wheel side elongated element 3 to said second wheel opposite side elongated element 9 so as to be adapted to be arranged straddling said brake disc 2.

The term "channel" means a conduit having an internally hollow integral body which, for most of the longitudinal path thereof, has an open cross section.

Said air conveying channel 18 includes a disc inlet channel side 20, an opposite disc outlet channel side 21, and a channel bottom 15.

Each of said channel sides 20, 21 extends between said first wheel side elongated element 3 and said second wheel opposite side elongated element 9 as a connecting bridge between said elongated elements 3, 9.

Advantageously, said channel sides 20, 21 are integral therewith.

Advantageously, said channel bottom 15 is integral with said disc inlet channel side 20 and opposite disc outlet channel side 21 thus forming, in a section transversal to said longitudinal extension of said channel 18, at least one channel seat 22 with longitudinal extension which runs through said channel 15 and is adapted to face, directly or indirectly, towards said brake disc 2 and also said second wheel opposite side elongated element 9, as well as said first wheel side elongated element 3.

Advantageously, said disc inlet channel side 20 includes a disc inlet channel side free edge 26.

Said disc outlet channel side 21 includes a disc outlet channel side portion free edge 27.

Said channel bottom 15 includes channel bottom portion free edge 28.

Particularly advantageously, said disc inlet channel side free edge 26, said disc outlet channel side portion free edge 27 and said channel bottom portion free edge 28 define a cooling air collection and conveying inlet 29.

According to one embodiment which cannot necessarily be combined with the embodiment(s) described above, said cooling air collection and conveying inlet 29 is adapted to project from the volume of wheel 6 in which said brake including said caliper body 1 is mounted.

According to one embodiment which cannot necessarily be combined with the embodiment(s) described above, each of said channel sides 20, 21 with a disc inlet channel side portion 23 and a disc outlet channel side portion 24, respectively, extends cantilevering beyond said second wheel opposite side elongated element 9.

According to one embodiment which cannot necessarily be combined with the embodiment(s) described above, said channel bottom 15 extends between said first wheel side elongated element 3 and said second wheel opposite side elongated element 9 without touching said second wheel opposite side elongated element 9.

According to one embodiment which cannot necessarily be combined with the embodiment(s) described above, said channel bottom 15, with a channel bottom portion 25 thereof, projects cantilevering along the longitudinal extension direction thereof beyond said second wheel opposite side elongated element 9.

According to one embodiment which cannot necessarily be combined with the embodiment(s) described above, said disc inlet channel side portion 23 includes a disc inlet channel side free edge 26.

According to one embodiment which cannot necessarily be combined with the embodiment(s) described above, said disc outlet channel side portion 24 includes a disc outlet channel side portion free edge 27.

According to one embodiment which cannot necessarily be combined with the embodiment(s) described above, said channel bottom portion 25 includes a channel bottom portion free edge 28.

Said disc inlet channel side free edge 26, said disc outlet channel side portion free edge 27 and said channel bottom portion free edge 28 define a cooling air collection and conveying inlet 29.

Said disc inlet channel side portion 23, said disc outlet channel side portion 24 and said channel bottom portion 25 are integral with said caliper body.

Particularly, with the present invention, said caliper body 1 is not associated with any separate air collection and conveying conduit.

According to one embodiment which cannot necessarily be combined with the embodiment(s) described above, each of said second wheel opposite side elongated element 9 and said first wheel side elongated element 3 includes at least one thrust device seat 12 adapted to receive a thrust device 13 adapted to influence the first and second pads 14, 16 against said first and second braking surfaces of brake disc 7, 8.

According to one embodiment which cannot necessarily be combined with the embodiment(s) described above, said disc inlet channel side portion 23, said disc outlet channel side portion 24 and said channel bottom portion 25 are folded about said second wheel opposite side elongated element 9, thus orienting said cooling air collection and conveying inlet 29 in a substantially radial direction R-R.

Said cooling air collection and conveying inlet 29 is adapted to be oriented—with caliper mounted on a vehicle—facing towards the forward drive direction of the vehicle itself.

According to one embodiment which cannot necessarily be combined with the embodiment(s) described above, said channel bottom 15 includes a channel bottom inner surface 30, adapted to face directly or indirectly towards said brake disc 2, and directed towards said second wheel opposite side elongated element 9 and towards said first wheel side elongated element 3, and a channel bottom outer surface 31 facing outwards with respect to said caliper body 1.

Said channel bottom inner surface 30 includes at least one, for example a plurality of, channel ribs 32—with increased heat exchange—which form channel rib slopes 33 and channel rib ridges 34, said channel ribs 32 extending along the longitudinal direction of said air conveying channel 18.

Said channel bottom outer surface 31 includes at least one, for example a plurality of, channel ribs 32—with increased heat exchange—which form channel rib slopes 33 and channel rib ridges 34, said channel ribs 32 extending along the longitudinal direction of said air conveying channel 18.

Said channel rib ridges 34 of said channel bottom outer surface 31 are aligned with said channel rib slopes 33 of said channel bottom inner surface 30.

According to one embodiment which cannot necessarily be combined with the embodiment(s) described above, at least one of said vehicle forward driving direction disc inlet side elongated element connecting bridge 17 and said vehicle forward driving direction disc outlet side elongated element connecting bridge 19 includes at least on an end bridge inner surface 35 thereof and/or on an end bridge outer surface 36 thereof, at least one, for example a plurality of, ribs 32 which form rib slopes 33 and rib ridges 34, said ribs 32 extending along the longitudinal direction of said end bridge 17; 19.

According to one embodiment which cannot necessarily be combined with the embodiment(s) described above, said rib ridges 34 of said end bridge outer surface 36 are aligned with said rib slopes 33 of said end bridge inner surface 35.

According to one embodiment which cannot necessarily be combined with the embodiment(s) described above, at least one of said vehicle forward driving direction disc inlet side elongated element connecting bridge 17 and vehicle forward driving direction disc outlet side elongated element connecting bridge 19 and air conveying channel and elongated element connecting bridge 18 includes at least on one of the inner or outer surfaces 30; 31; 35; 36 thereof, a plurality of recesses 37, for example forming spherical cap seats with increased heat exchange.

According to one embodiment which cannot necessarily be combined with the embodiment(s) described above, at least one of said vehicle forward driving direction disc inlet side elongated element connecting bridge 17 and said vehicle forward driving direction disc outlet side elongated element connecting bridge 19 are two end bridges 19, 38, both placed in circumferential direction C-C outside each thrust device 13.

According to one embodiment which cannot necessarily be combined with the embodiment(s) described above, said vehicle forward driving direction disc outlet side elongated element connecting bridge 19 are two vehicle forward driving direction disc outlet side elongated element connecting bridges, a first and a second vehicle forward driving direction disc outlet side elongated element connecting bridge 19, 38 which define an end window 39 of air discharge from the caliper body 1 between them and the elongated elements 3, 9.

According to one embodiment which cannot necessarily be combined with the embodiment(s) described above, at least one of said first wheel side elongated element 3 and said second wheel opposite side elongated element 9 has lowerings 40, or relieves, which create indentations around at least one thrust device 13 to lighten the caliper body, to increase the heat exchange and cooling surface of the caliper body.

According to one embodiment which cannot necessarily be combined with the embodiment(s) described above, at least one of said first wheel side elongated element 3 and said second wheel opposite side elongated element 9 has at least one elongated element opening 41 which connects two opposite sides of the elongated element, such as two radially opposite sides.

According to one embodiment which cannot necessarily be combined with the embodiment(s) described above, said at least one elongated element opening 41 is provided between two adjacent thrust devices 13 for the passage of cooling air around said thrust devices 13.

The present invention also relates to a caliper 42 comprising a caliper body as defined in any one of the embodiments described above.

According to one embodiment which cannot necessarily be combined with the embodiment(s) described above, caliper 42 comprises a spring 43 provided between said air conveying channel and elongated element connecting bridge 18 and said pads 14, 16, for moving away said pads from the braking surfaces 7, 8 of said brake disc 2 to cease the braking action of the vehicle.

According to one embodiment which cannot necessarily be combined with the embodiment(s) described above, said spring 43 rests on the disc inlet channel side 20 and on the disc outlet channel side 21, thus forming a barrier between said channel 18 and the brake disc 2, thus preventing the heating of the air passing in said channel and/or helping the channeling of the air in the passage to the first wheel side elongated element 3.

The present invention also relates to a vehicle comprising a caliper 42 according to at least one of the embodiments described above.

Those skilled in the art may make many changes and adaptations to the embodiments described above or replacements with other elements which are functionally equivalent in order to satisfy contingent needs without however departing from the scope of the appended claims.

LIST OF REFERENCES

1 Disc brake caliper body
2 brake disc
3 first wheel side elongated element
4 caliper outer side of first elongated element
5 caliper inner side of first elongated element
6 vehicle wheel
7 first braking surface of brake disc
8 second braking surface of brake disc
9 second wheel opposite side elongated element
10 caliper outer side of second elongated element
11 caliper inner side of second elongated element
12 thrust device seat
13 thrust device
14 first pad
15 channel bottom
16 second opposite pad
17 vehicle forward driving direction disc inlet side elongated element connecting bridge
18 air conveying channel and elongated element connecting bridge
19 vehicle forward driving direction disc outlet side elongated element connecting bridge
20 disc inlet channel side
21 disc outlet channel side
22 channel seat
23 disc inlet channel side portion
24 disc outlet channel side portion,
25 channel bottom portion
26 disc inlet channel side free edge
27 disc outlet channel side portion free edge
28 channel bottom portion free edge
29 cooling air collection and conveying inlet
30 channel bottom inner surface
31 channel bottom outer surface
32 channel ribs
33 channel rib slopes
34 channel rib ridges
35 end bridge inner surface
36 end bridge outer surface
37 plurality of spherical cap recesses
38 second thrust device outer end bridge 39 end window
40 lowerings
41 elongated element opening
42 Caliper
43 spring
A-A axial direction
R-R radial direction
C-C circumferential direction

The invention claimed is:

1. A caliper body adapted to arrange straddling a brake disc, said brake disc comprising a first braking surface of brake disc and an opposite second braking surface of brake disc, said caliper body comprising:
   a first wheel side elongated element, including a caliper outer side of first elongated element and a caliper inner side of first elongated element, wherein said caliper outer side of first elongated element is adapted to face towards a vehicle wheel and wherein at least a portion of the caliper inner side of first elongated element is adapted to at least partially face, through a first pad, towards said first brake disc braking surface;
   a second wheel opposite side elongated element, including a caliper outer side of second elongated element and a caliper inner side of second elongated element, wherein at least a portion of the caliper inner side of second elongated element is adapted to at least partially face, through a second opposite pad, towards said second brake disc braking surface;
   at least one of said first wheel side elongated element and said second wheel opposite side elongated element includes at least one thrust device seat adapted to receive a thrust device adapted to influence the first or the second pad against said first or second brake disc braking surface;
   said caliper body includes at least one elongated element connecting bridge which connects said first wheel side elongated element to said second wheel opposite side elongated element so as to be adapted to arrange straddling said brake disc;
   said caliper body includes at least one air conveying channel which extends transversely with respect to the caliper body as a connecting bridge which connects said first wheel side elongated element to said second wheel opposite side elongated element so as to be adapted to arrange straddling said brake disc;
   said air conveying channel includes a disc inlet channel side, an opposite disc outlet channel side, and a channel bottom;
   said channel bottom of said air conveying channel opening directly to said brake disc;
   each of said channel sides extends between said first wheel side elongated element and said second wheel side elongated element as a connecting bridge between said elongated elements and integral therewith;
wherein
   said channel bottom is integral with said disc inlet channel side and opposite disc outlet channel side forming, in a section transversal to a primary direction of said channel, at least one channel seat, which runs through said channel, and is adapted to at least partially face towards said brake disc and also to said second wheel side elongated element and also to said first wheel side elongated element; and wherein
   said disc inlet channel side includes a disc inlet channel side free edge; and wherein
   said disc outlet channel side includes a disc outlet channel side portion free edge; and wherein
   said channel bottom includes channel bottom portion free edge; and wherein said disc inlet channel side free edge, said disc outlet channel side portion free edge and said channel bottom portion free edge define a cooling air collection and conveying inlet; and wherein
   said air conveying channel is integral with said caliper body.

2. The caliper body according to claim 1, wherein
   each of said channel sides with a disc inlet channel side portion thereof and disc outlet channel side portion extends cantilevering beyond said second wheel opposite side elongated element; and wherein
   said channel bottom extends between said first wheel side elongated element and said second wheel side elongated element without touching said second wheel opposite side elongated element; and wherein
   said channel bottom with a channel bottom portion thereof projects cantilevering along the extension of the air cooling channel from the first wheel side elongated element to the opposite second wheel side elongated element; and wherein
   said disc inlet channel side portion includes a disc inlet channel side free edge; and wherein
   said disc outlet channel side portion includes a disc outlet channel side portion free edge; and wherein
   said channel bottom portion includes channel bottom portion free edge; and wherein
   said disc inlet channel side free edge, said disc outlet channel side portion free edge and said channel bottom portion free edge define a cooling air collection and conveying inlet; and wherein
   said disc inlet channel side portion, said disc outlet channel side portion and said channel bottom portion are integral with said caliper body;
   wherein said caliper body is not associated to any separate air collection and conveying conduit.

3. The caliper body according to claim 1, wherein
   each of said second wheel opposite side elongated element and said first wheel side elongated element includes at least one thrust device seat adapted to receive said thrust device adapted to influence the first and the second pad against said first and second brake disc braking surface.

4. The caliper body according to claim 1, wherein
   said disc inlet channel side portion, said disc outlet channel side portion and said channel bottom portion are folded about said second wheel opposite side elongated element, orienting said cooling air collection and conveying inlet in a substantially transverse direction with respect to the caliper body; or wherein
   said cooling air collection and conveying inlet is adapted to be oriented, with caliper mounted on a vehicle, facing towards a forward drive direction of the vehicle itself.

5. The caliper body according to claim 1, wherein
   said channel bottom includes a channel bottom inner surface, adapted to be facing towards said brake disc, and directed towards said second wheel opposite side elongated element and towards said first wheel side elongated element, and a channel bottom outer surface facing outwards with respect to said caliper body, wherein
   said channel bottom inner surface includes at least one, for example a plurality of channel ribs, with increased heat exchange forming channel rib slopes and channel rib ridges, said channel ribs extend along said air conveying channel; or wherein said channel bottom outer surface includes a plurality of channel ribs, with increased heat exchange forming channel rib slopes and channel rib ridges, said channel ribs extend along said air conveying channel; or wherein said channel rib ridges of said channel bottom outer surface are aligned with said channel rib slopes of said channel bottom inner surface.

6. The caliper body according to claim 1, wherein at least one of said vehicle forward driving direction disc inlet side elongated element connecting bridge and said vehicle forward driving direction disc outlet side elongated element connecting bridge includes at least on an end bridge inner surface thereof and/or end bridge outer surface thereof a plurality of ribs which form rib slopes and rib ridges, said ribs extend along said end bridge; or wherein said rib ridges of said end bridge outer surface are aligned with said rib slopes of said end bridge inner surface; or wherein at least one of said vehicle forward driving direction disc inlet side elongated element connecting bridge and vehicle forward driving direction disc outlet side elongated element connecting bridge and air conveying channel and elongated element connecting bridge includes at least on one of the inner or outer surfaces thereof a plurality of recesses, forming spherical cap seats with increased heat exchange.

7. The caliper body according to claim 1, wherein at least one of said vehicle forward driving direction disc inlet side elongated element connecting bridge and said vehicle forward driving direction disc outlet side elongated element connecting bridge are two end bridges, both placed in circumferential direction outside each thrust device; or wherein said vehicle forward driving direction disc outlet side elongated element connecting bridge are two vehicle forward driving direction disc outlet side elongated element connecting bridges, a first and a second vehicle forward driving direction disc outlet side elongated element connecting bridge defining between them and the elongated elements an end window of air discharge from the caliper body.

8. The caliper body according to claim 1, wherein at least one of said wheel side elongated element and said second wheel opposite side elongated element has lowerings, or relieves, creating indentations around at least one thrust device, for lightening the caliper body, to increase the heat exchange and cooling surface of the caliper body; or wherein at least one of said first wheel side elongated element and said second wheel opposite side elongated element has at least one elongated element opening which connects two opposite sides of the elongated element; or wherein said at least one elongated element opening is provided between two adjacent thrust devices for the passage of cooling air around said thrust devices; or wherein said at least one elongated element opening is a through opening; or wherein said at least one elongated element opening is radially directed.

9. The caliper according to claim 1, wherein a spring is provided between air conveying channel and elongated element connecting bridge and said pads, for removing said pads from the braking surfaces of said brake disc upon the end of the vehicle braking action; or wherein said spring rests on the disc inlet channel side and on the disc outlet channel side, forming a barrier between said channel and the brake disc, preventing the heating of the air passing in said channel and/or helping the channeling of the air in the passage to the first wheel side elongated element.

10. A caliper body adapted to arrange straddling a brake disc, said brake disc comprising a first braking surface of brake disc and an opposite second braking surface of brake disc, said caliper body comprising:

a first wheel side elongated element, including a caliper outer side of first elongated element and a caliper inner side of first elongated element;

a second wheel opposite side elongated element, including a caliper outer side of second elongated element and a caliper inner side of second elongated element;

said caliper body includes at least one air conveying channel which extends transversely with respect to the caliper body as a connecting bridge which connects said first wheel side elongated element to said second wheel opposite side elongated element so as to be adapted to arrange straddling said brake disc;

said air conveying channel includes a disc inlet channel side, an opposite disc outlet channel side, and a channel bottom;

said channel bottom of said air conveying channel opening directly to said brake disc;

each of said channel sides extends between said first wheel side elongated element and said second wheel side elongated element as a connecting bridge between said elongated elements and integral therewith;

wherein said channel bottom is integral with said disc inlet channel side and opposite disc outlet channel side forming, in a section transversal to a primary direction of said channel, at least one channel seat, which runs through said channel, and is adapted to at least partially face towards said brake disc and also to said second wheel side elongated element and also to said first wheel side elongated element; and wherein said disc inlet channel side includes a disc inlet channel side free edge; and wherein said disc outlet channel side includes a disc outlet channel side portion free edge; and wherein said channel bottom includes channel bottom portion free edge; and wherein said disc inlet channel side free edge, said disc outlet channel side portion free edge and said channel bottom portion free edge define a cooling air collection and conveying inlet; and wherein said air conveying channel is integral with said caliper body.

* * * * *